US012393637B1

(12) United States Patent
Jain

(10) Patent No.: US 12,393,637 B1
(45) Date of Patent: Aug. 19, 2025

(54) HIERARCHICAL DOCUMENT PARSING AND METADATA GENERATION FOR MACHINE LEARNING APPLICATIONS

(71) Applicant: Citigroup Inc., New York, NY (US)

(72) Inventor: Akshay Jain, Pune (IN)

(73) Assignee: Citigroup Inc., New York, NY (US)

( * ) Notice: Subject to any disclaimer, the term of this patent is extended or adjusted under 35 U.S.C. 154(b) by 0 days.

(21) Appl. No.: 19/007,333

(22) Filed: Dec. 31, 2024

(51) Int. Cl.
*G06F 16/93* (2019.01)
*G06F 16/22* (2019.01)
*G06F 16/245* (2019.01)
*G06F 16/25* (2019.01)

(52) U.S. Cl.
CPC .......... *G06F 16/93* (2019.01); *G06F 16/2237* (2019.01); *G06F 16/2246* (2019.01); *G06F 16/245* (2019.01); *G06F 16/258* (2019.01)

(58) Field of Classification Search
CPC .............. G06F 16/1794; G06F 16/223; G06F 16/2246; G06F 16/245; G06F 16/258; G06F 16/313; G06F 16/316; G06F 16/33; G06F 16/35; G06F 16/93; G06F 40/20; G06F 40/205; G06F 40/216; G06F 40/253; G06F 40/258
See application file for complete search history.

(56) References Cited

U.S. PATENT DOCUMENTS

| | | | | |
|---|---|---|---|---|
| 6,377,946 B1 * | 4/2002 | Okamoto | ................ | G06F 16/81 |
| | | | | 707/999.005 |
| 8,209,605 B2 * | 6/2012 | Poston | .................... | G06F 16/34 |
| | | | | 715/273 |
| 10,878,195 B2 * | 12/2020 | Duta | .................... | G06V 30/153 |
| 2009/0172517 A1 * | 7/2009 | Kalicharan | ........... | G06F 40/205 |
| | | | | 715/234 |
| 2016/0162456 A1 * | 6/2016 | Munro | .............. | G06F 16/24532 |
| | | | | 704/9 |
| 2021/0232613 A1 * | 7/2021 | Raval Contractor | .... | G06N 5/02 |

(Continued)

FOREIGN PATENT DOCUMENTS

| | | | | |
|---|---|---|---|---|
| CN | 117807199 A | * | 4/2024 | ......... G06F 16/3329 |
| CN | 118964691 A | * | 11/2024 | |

OTHER PUBLICATIONS

Rausch et al. "DSG: An End-to-End Document Structure Generator," 2023 IEEE International Conference on Data Mining (ICDM), Shanghai, China, 2023, pp. 518-527, doi: 10.1109/ICDM58522. 2023.00061. (Year: 2023).*

(Continued)

*Primary Examiner* — James E Richardson
(74) *Attorney, Agent, or Firm* — Davis Wright Tremaine LLP

(57) ABSTRACT

A document is analyzed to identify attributes of the document. A set of statistical measures are calculated for each of the formatting attributes. A correlation between these statistical measures and elements of the document are identified. A hierarchical relationship is determined between the elements of the document. Data from the document is split into chunks using the hierarchical relationship. A representation of the document that includes the hierarchical structure is then generated. The representation is stored in a data store as a vector usable by a machine learning model to perform a query on the document according to the hierarchical structure.

21 Claims, 9 Drawing Sheets

(56) References Cited

U.S. PATENT DOCUMENTS

2022/0245326 A1* 8/2022 Stabler .................. G06F 40/253
2024/0362197 A1* 10/2024 Thompson ........... G06V 30/412

OTHER PUBLICATIONS

Malashin et al. "Automated Text Structuring: Natural Language Processing and Regular Expressions in XML Tag Filling," in IEEE Access, vol. 12, pp. 190582-190597, 2024, doi: 10.1109/ACCESS.2024.3511674. (Year: 2024).*

* cited by examiner

Animals Large & Extra Large

*Search within the Wildlife Resource Center below.*

Overview

Click here to expand

1. Animals X Large: Species (such as elephants) that have an average weight (at maturity) of 5,000 kg or more.
2. Animals Large: Species (such as giraffes) that have an average weight (at maturity) of at least 1,000 kg and less than 5,000 kg.

An animal species is a group of living organisms consisting of similar individuals capable of exchanging genes or interbreeding. They are classified based on various characteristics such as size, habitat, and behavior. Large and extra-large animals often play crucial roles in their ecosystems, influencing the environment and other species around them.

FIG. 7A

```
"elements": [
  {
    "heading": {
      "style": {
        "bold": true,
        "italic": false,
        "font_name": "Helvetica-Bold",
        "mapped_font_size": "xlarge",
        "mean_size": 18.0,
        "max_size": 18.0
      },
      "page": 1,
      "text": "Animals Large & Extra Large"
    },
    "children": [
      {
        "heading": {
          "style": {
            "bold": false,
            "italic": false,
            "font_name": "Helvetica",
            "mapped_font_size": "middle",
            "mean_size": 7.5,
            "max_size": 7.5
          },
          "page": 1,
          "text": "Search within the Wildlife Resource Center below."
        },
        "children": [],
        "level": 1
```

FIG. 7B

HIERARCHICAL DOCUMENT PARSING AND METADATA GENERATION FOR MACHINE LEARNING APPLICATIONS

BACKGROUND

Typical document parsers often disregard the visual presentation of a document, and do not take note of the document's hierarchical structure. This can lead to a loss of context of the data as well as inaccurate data extraction and interpretation by generative artificial intelligence models searching these documents. However, a document may encapsulate more than text, but may also include layout aspects that affect a visual appearance of the document, and, inherently contribute to the context of the surrounding data. As a result, a document parser parsing a document that contains a collection of various text and non-text elements and attributes, such as headers, sub-headers, images, table, and paragraphs, does not take into account the logical structure or relationships between the different elements and attributes, and outputs results that are incomplete or omit the context of the data.

BRIEF DESCRIPTION OF THE DRAWINGS

Various techniques will be described with reference to the drawings, in which:

FIG. 7A illustrates an example of a document parser applied to a complex document to extract relevant information for a generative artificial intelligence (AI) model, in accordance with an embodiment;

FIG. 7B illustrates an example of a JavaScript Object Notation (JSON) representation of the complex document to extract relevant information for a generative AI model, in accordance with an embodiment.

SUMMARY

Figure 1:
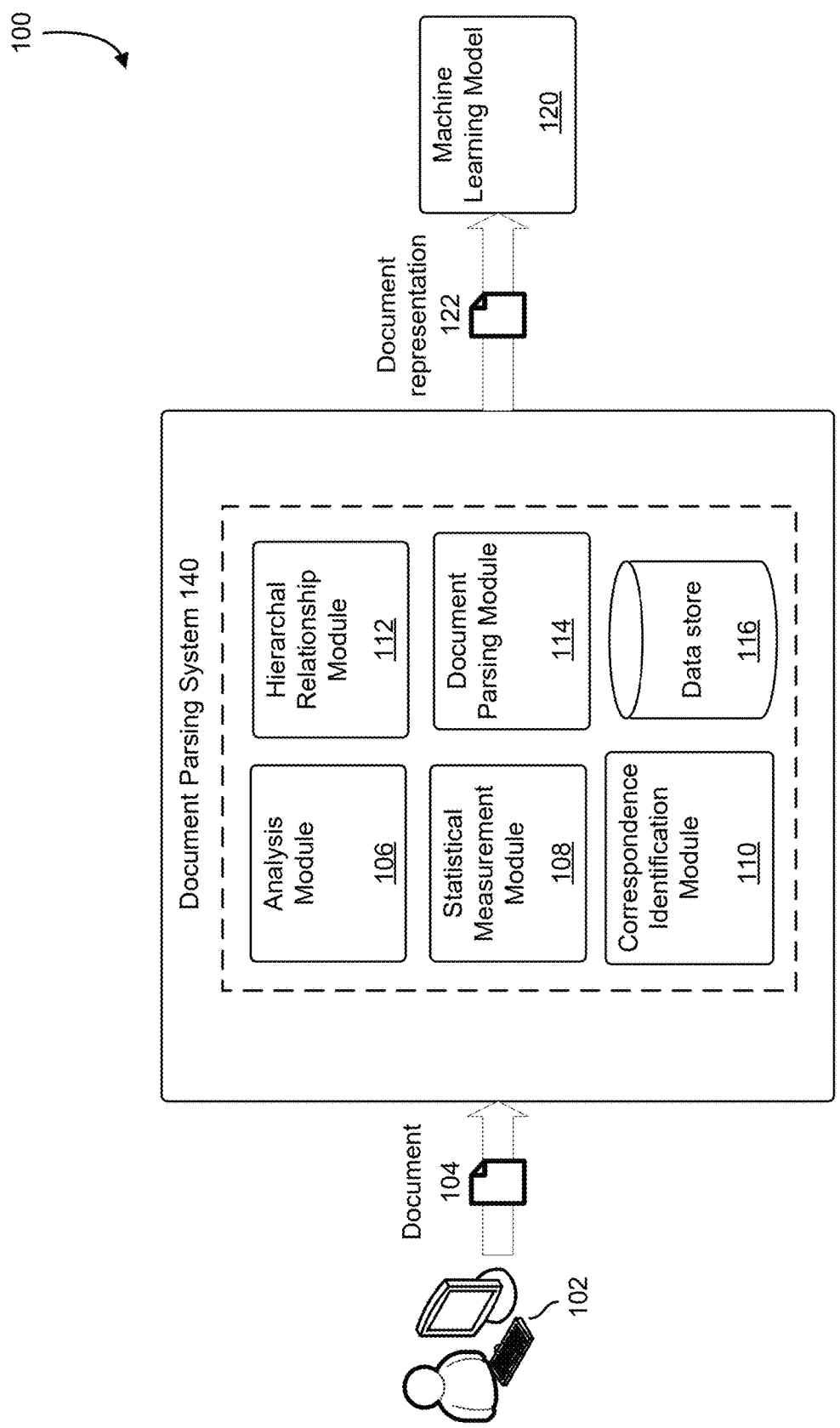
FIG. 1 illustrates an example of an overview of a hierarchical document parsing system, in accordance with an embodiment.

The techniques described herein pertain to a system and method for processing documents to enhance their utility in machine learning applications. For example, the method may include receiving a document that contains multiple elements organized in a hierarchical structure. The document is then analyzed to identify various formatting attributes associated with these elements. A series of statistical measures are calculated for the identified formatting attributes within the document, aiding in understanding the distribution and occurrence of different formatting styles. Furthermore, the method may include identifying correspondences between the calculated statistical measures and the types of elements present in the document. These different elements may relate to each other based on their formatting. Using the identified correspondences, the method can identify the hierarchical relationship among the different element types, for accurately parsing the document. Additionally, the document may be parsed into chunks while preserving its context, using the established hierarchical relationship. This ensures that the document's original structure is maintained. From the parsed chunks, a representation of the document is generated, which includes a hierarchical structure that mirrors the document's original organization. This representation is then stored in a data store as a vector, designed to be used by a machine learning model, enabling it to perform queries on the document according to its hierarchical structure. In at least one embodiment, the hierarchical structure is employed to ensure that data is segmented and stored in a manner that preserves the interrelationships among various components of the document. In at least one embodiment, upon receiving a query, the system retrieves pertinent data segments according to the established hierarchy, which is reflected in the response.

In at least one embodiment, parsing refers to the process of analyzing a document's structure to identify and categorize its components, such as headers, subheadings, paragraphs, tables, and images. For example, when parsing a Portable Document Format (PDF) document, the system may identify text elements based on font size and style to determine the hierarchical structure of the document. In another example, parsing a webpage might involve extracting metadata and hyperlinks to understand the document's layout and content relationships. In at least one embodiment, chunking involves dividing a document into smaller, meaningful sections or "chunks" to facilitate efficient data retrieval and processing. For instance, a large PDF document might be chunked into sections based on headings and subheadings, allowing specific sections to be retrieved in response to user queries. In another example, chunking could involve splitting a text document into paragraphs or sentences, enabling targeted analysis and information extraction.

In at least one embodiment, a document that includes a plurality of elements in a hierarchical relationship with each other is received. The document is analyzed to identify a plurality of formatting attributes of the plurality of elements. A plurality of statistical measures of the plurality of formatting attributes occurring within the document is calculated. Correspondences between the plurality of statistical measures and a plurality of element types of the plurality of elements, such as headings, subheadings, paragraphs, tables, and images, are identified. The hierarchical relationship between the plurality of element types is determined based on the correspondences. For example, statistical measures such as mean, median, and mode of font sizes and styles may be used to establish correlations between headings and subheadings, allowing the system to discern the document's structure. In another example, in PDF documents, the system can differentiate between main headings and subheadings by recognizing variations in font size and style, such as bold or italicized text. Additionally, it can identify tables by detecting grid structures and images by recognizing embedded graphic formats. This capability extends to other document types, such as Word or other word processing documents, where the system can parse content based on formatting cues like underlined or highlighted text, ensuring comprehensive data extraction across diverse document formats. This analysis helps in dynamically parsing documents by recognizing patterns and relationships among different elements, ensuring accurate data extraction tailored to specific user requirements. The document is parsed into chunks that preserve context of the document using the hierarchical relationship. A representation of the document that includes a hierarchical structure of the document is generated from the chunks. The representation is stored in a data store as a vector usable by a machine learning model to perform a query on the document according to the hierarchical structure.

In at least one embodiment, a document parsing system is designed to generate context for Generative AI applications by preserving the hierarchical structure of documents. In at least one embodiment, the system maintains the integrity of data, including headers, headings, sub-headings, images, tables, and text paragraphs, which may be useful for the success of Large Language Models (LLMs).

In at least one embodiment, the document Parser is developed using software, such as Python, and leverages libraries to parse documents while preserving their hierarchical structure. In at least one embodiment, the system captures the information in the same document format, ensuring that the context remains intact, thereby enhancing the effectiveness of Generative AI applications.

In at least one embodiment, the system first reads the entire document to understand its structure, including the size, color, and style of the text. In at least one embodiment, it calculates statistical measures such as mean, median, and mode to identify the characteristics of headings, sub-headings, and body text.

In at least one embodiment, the system uses the calculated statistical measures to identify and categorize different elements of the document, such as headings, sub-headings, and body text. In at least one embodiment, this categorization helps in maintaining the hierarchical structure of the document.

In at least one embodiment, the system chunks the document into meaningful sections based on the identified categories. In at least one embodiment, this chunking process ensures that the context is preserved and can be effectively used by LLMs for generating accurate and relevant responses.

In at least one embodiment, the system stores the parsed and structured data in a JSON format. In at least one embodiment, this format allows for easy manipulation and retrieval of data, ensuring that the hierarchical relationships between the elements are maintained.

In at least one embodiment, the system includes a metadata component that captures additional information about the document, such as the location of images, tables, and other non-text elements. In at least one embodiment, this metadata helps in accurately retrieving and presenting the relevant information when queried.

In at least one embodiment, the system of the present disclosure can handle various types of documents, including PDF files, web pages, spreadsheets (e.g.,), images, and other data files. The documents may be stored in one or more non-transitory computer-readable media in a file system or data store, and/or may be transferred, streamed, or downloaded from one computing device to another computing device via a computer network. In at least one embodiment, it uses a similar approach to parse and preserve the hierarchical structure of these documents, ensuring that the context is maintained. In at least one embodiment, the system may parse through an entire document to extract and identify various types of information. In at least one embodiment, this parsing process is to identify and categorize different elements within the document, such as headings, subheadings, sub-subheadings, and paragraphs. By analyzing the style distribution of the data, including font size and context, the system can accurately identify the hierarchical structure of the document. In at least one embodiment, the system may identify URLs, images, and tables within the text, allowing for a comprehensive analysis of the document's content.

In at least one embodiment, the system utilizes information extracted from documents to calculate statistical metrics such as mean, median, and mode. In at least one embodiment, these calculations are performed on different document elements, including images, tables, paragraphs, URLs, and graphs. By analyzing these metrics, the system can provide valuable insights into the document's composition and content distribution. In at least one embodiment, the document's composition refers to the structural elements of a document, such as headings, subheadings, paragraphs, and other formatting features that define how the content is organized. For example, in a PDF document, the system might identify that the mean font size of headings is larger than that of the body text, indicating a hierarchical structure. In at least one embodiment, the document's content distribution refers to how different types of content are spread throughout the document. For instance, the system might analyze a document and determine that images are predominantly located in the first half, while tables are more frequent in the latter half. This analysis helps in understanding the layout and focus areas of the document. This analytical capability enhances the system's ability to process and interpret complex documents, making it a powerful tool for data analysis and information management.

In at least one embodiment, the system stores a graph image alongside metadata, which may be located proximate to the graph. This metadata may include detailed descriptions and analyses, which may be used for contextualizing the graph. By maintaining this association, the system ensures that when a user requests specific information, the relevant graph can be accurately identified and presented. This approach allows the system to effectively utilize the graph's visual representation as part of its data retrieval process, even though the graph itself is treated as an image.

In at least one embodiment, the system leverages metadata linked to each graph to enhance its response capabilities. This process involves accessing the metadata to understand the graph's context and relevance to the query, enabling the system to provide an accurate response. For example, integration of metadata with graph image may enable the system to generate comprehensive answers, even when the graphical data cannot be directly parsed.

In at least one embodiment, by storing and retrieving graph images based on their metadata, the system can respond to complex queries that require visual data representation. In at least one embodiment, a system enhances data analysis and information management by associating metadata with graphical content, where metadata facilitates the integration of graphical content with textual analysis, enabling the system to deliver pertinent information to users.

In at least one embodiment, the system can be configured to handle specific requirements, such as storing images in a particular location or treating certain elements differently. In at least one embodiment, this configurability allows for flexibility in handling different types of documents and use cases. In at least one embodiment, a system is configured to receive a query from a client device of a user, where the query includes a requirement corresponding to a specific chunk of a document. In at least one embodiment, this system further comprises a component that provides input to a machine learning model, with the input being derived, at least in part, from the requirement and an associated vector. In at least one embodiment, the system includes a mechanism for delivering data to the client device, where the data is derived from the output of the machine learning model in response to the query. This configuration enables the system to efficiently process user queries by utilizing machine learning to analyze and interpret document content.

In at least one embodiment, the system may process a JSON document by dividing it into multiple chunks, such as headings and subheadings, to facilitate user-specific comprehension. In at least one embodiment, users can independently rearrange these chunks based on their unique requirements, resulting in different outputs despite having the same initial input. In at least one embodiment, the system organizes content into metadata categories, such as metadata 1, metadata 2, and metadata 3, allowing users to directly query the system for more precise and enhanced outputs.

In at least one embodiment, the system uses a tree structure to represent the parsed data, which helps in understanding the hierarchical relationships between different elements. In at least one embodiment, this tree structure is represented in a list format, making it easy to read and manipulate.

In at least one embodiment, the system can be integrated with LLMs to provide the necessary context for generating accurate and relevant responses. In at least one embodiment, the parsed and structured data is used as input to the LLM, which refines the responses based on the context provided.

In at least one embodiment, the system can handle complex documents with multiple headings, sub-headings, images, and tables. In at least one embodiment, it ensures that the context is preserved, even in documents with a high level of complexity.

In at least one embodiment, the system can be used in various applications, such as knowledge management, document analysis, and information retrieval. In at least one embodiment, it provides a robust solution for generating context for Generative AI applications, improving their performance and accuracy.

In at least one embodiment, the system can be enhanced to include Optical Character Recognition (OCR) capabilities, allowing it to handle scanned documents and images with text. In at least one embodiment, this enhancement would further improve the system's ability to generate context for LLMs.

In at least one embodiment, the system provides a comprehensive solution for parsing and preserving the hierarchical structure of document documents, ensuring that the context is maintained and can be effectively used by Generative AI applications.

These techniques provide a systematic approach to document processing, facilitating more effective use of documents in machine learning models by preserving their hierarchical context and structure.

DETAILED DESCRIPTION

Techniques and systems described below relate to a hierarchical document parsing system. This system preserves the hierarchical structure of documents, ensuring the context and integrity of data. In embodiments, the hierarchical document parsing system, also referred to as a parser, analyzes an entire document to identify and differentiate elements such as headers, sub-headers, images, tables, and paragraphs based on formatting attributes like font size, color, and style. By maintaining metadata about the document's hierarchy and the relationships between sections, the parser enables precise chunking of the document. This method enhances the extraction of meaningful and relevant information by generative Artificial Intelligence (AI) models, resulting in more accurate and pertinent responses.

The techniques described in this disclosure improve the field of computing, particularly machine learning, by implementing a hierarchical document parsing system that preserves the hierarchical structure of documents. This ensures that the context and integrity of the data are maintained. Additionally, these techniques improve the efficiency and functionality of computing systems performing machine learning by retaining metadata about the hierarchy and relationships between different document sections. This allows generative AI models to extract more meaningful and relevant information. Furthermore, the techniques are fundamentally rooted in computer technology to address issues specifically arising from data extraction systems that fail to preserve a document's hierarchical structure, which can lead to a loss of data context and inaccurate data extraction and interpretation by generative AI models.

In the preceding and following description, various techniques are described. For purposes of explanation, specific configurations and details are set forth to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

The present disclosure also provides computer programs and computer program products comprising software code adapted, when executed on a data processing apparatus, to perform any of the methods and/or embody any of the apparatus and system features described herein, including any or all of the component steps of any method. The present disclosure also provides a computer or computing system (including networked or distributed systems) having an operating system that supports a computer program for carrying out any of the methods described herein and/or embodying any of the apparatus or system features described herein. The present disclosure also provides computer-readable media having stored thereon any one or more of the aforementioned computer programs. The present disclosure extends to methods and/or apparatus and/or systems as herein described with reference to the accompanying drawings. To further describe the present technology, examples are now provided with reference to the figures.

FIG. 1 illustrates an aspect of an environment 100 for a document parsing system 140 in which an embodiment may be practiced. In some embodiments, users 102 of this environment 100 include but are not limited to client users of the document parsing system 140. In at least one embodiment, as illustrated in FIG. 1, the environment 100 includes a document parsing system 140 as described herein, that receives for a user 102, also known herein as a requestor, of the hierarchical document parsing system a document 104 into the system. This document is then processed by the document parsing system 140, which comprises several interconnected modules. The analysis module 106, is usable for analyzing the document to identify formatting attributes of its elements. This analysis may be used for understanding the structure and style of the document, which aids in the subsequent identification of elements. Following this, a statistical measurement module 108 calculates a statistical measure of each identified formatting attribute, providing quantitative data that will be used in further processing. The process continues with the correspondence identification module 110, which identifies correlations between the statistical measures and the element types within the document. This correlation may be used for determining a hierarchical relationship between different element types, a task performed by the hierarchical relationship module 112. Once the hierarchical relationships are established, the document parsing module 114 uses this information to parse the document into chunks, maintaining the hierarchical structure. The parsed document is then stored in the data store 116 as a document representation 122, which includes the hierarchical structure. This representation is formatted as a vector, making it usable by machine learning model 120 to perform queries on the document, thereby enhancing the model's ability to extract meaningful and relevant information.

The terms "documents" and "document" may be used interchangeably in the present disclosure where the scope of the embodiment can include "one or more documents."

In at least one embodiment, the document parsing system 140 is designed to efficiently process documents by breaking them down into their fundamental components. This system serves as the backbone for transforming raw document data into a structured format that can be further analyzed and utilized by other modules within the system. The document parsing system 140 may be useful for ensuring that the document's content is accurately interpreted and organized.

In at least one embodiment, the user 102 interacts with the document parsing system 140 to input documents that require analysis. This interaction is the starting point of the document processing workflow, allowing the system to begin its task of parsing and analyzing the document content to extract meaningful information. The user's role may be used in providing the initial data that the system will work on.

In at least one embodiment, the document 104 represents the input that the system receives from the user. This document can be in various formats and contains the data that needs to be parsed and analyzed. The document serves as the primary source of information that the system will work on to generate structured outputs, making it a critical component of the overall process.

In at least one embodiment, analysis module 106 is a computing resource that processes document content to identify key features. In at least one embodiment, a neural network uses analysis module 106 to extract text patterns and structures. In at least one embodiment, analysis module 106 identifies headings in a document. In at least one embodiment, analysis module 106 detects tables within documents containing headings, tables, images, and/or other visual elements.

In at least one embodiment, the analysis module 106 applies various analytical techniques to understand the document's structure and content, which may be used for identifying key elements and relationships within the document. The analysis module 106 ensures that the document is thoroughly examined for accurate processing.

In at least one embodiment, statistical measurement module 108 is a computing resource that calculates statistical attributes of document elements. In at least one embodiment, a neural network uses statistical measurement module 108 to identify font size and color variations. In at least one embodiment, statistical measurement module 108 assesses font width, for example, in a corporate report. In at least one embodiment, statistical measurement module 108 evaluates color intensity, for example, in a marketing brochure.

In at least one embodiment, the statistical measurement module 108 calculates various statistical measures related to the document's formatting attributes. These measures provide insights into the document's structure and are used to identify patterns and correspondences that may be used for further analysis. The statistical measurement module 108 may be used in quantifying the document's characteristics.

In at least one embodiment, correspondence identification module 110 is a computing resource that matches document elements with predefined categories. In at least one embodiment, a neural network uses correspondence identification module 110 to align document sections with metadata. In at least one embodiment, correspondence identification module 110, for example, links executive summaries to metadata tags, In at least one embodiment, correspondence identification module 110, for example, associates financial tables with relevant metadata. In at least one embodiment, correspondence identification module 110 identifies correspondences between statistical measures and element types within the document. This identification process is usable in understanding how different elements relate to each other and contributes to the overall analysis of the document. The correspondence identification module 110 ensures that relationships are accurately mapped.

In at least one embodiment, hierarchical relationship module 112 is a computing resource that organizes document elements into a structured hierarchy. In at least one embodiment, a neural network uses hierarchical relationship module 112 to establish parent-child relationships among document sections. In at least one embodiment, hierarchical relationship module 112 may, for example, arrange chapters and subchapters in a technical manual. In at least one embodiment, hierarchical relationship module 112 structures, for example, sections and subsections in a legal document.

In at least one embodiment, the hierarchical relationship module 112 determines relationships or correlations between different elements within the document. In at least one embodiment, correlations between elements documents may be determined by parsing the document to identify and categorize various components such as headers, headings, subheadings, images, tables, and paragraphs. In at least one embodiment, a parser analyzes style distribution of text elements, using metrics such as font size and style, to establish a hierarchical structure that reflects the document's original format. In at least one embodiment, metadata is generated to maintain context and relationships between different sections of a document, enabling accurate retrieval and interpretation of information. In at least one embodiment, this structured data is stored in a vector database, allowing for efficient querying and retrieval of relevant information based on user queries. This, for example, may enhance the accuracy of responses generated by a large language model. By establishing these relationships, the module helps in organizing the document's content in a way that reflects its inherent structure, making it easier to analyze and interpret. This module may be useful for maintaining the logical flow of the document.

In at least one embodiment, document parsing module 114 is a computing resource that extracts and formats document content for further processing. In at least one embodiment, a neural network uses document parsing module 114 to convert unstructured data into structured data. In at least one embodiment, document parsing module 114 parses text from scanned images. In at least one embodiment, document parsing module 114 extracts data from complex spreadsheets. In at least one embodiment, the document parsing module 114 breaks down the document into smaller, more manageable chunks. This parsing process may be guided by the hierarchical relationships identified earlier, ensuring that the document is divided in a way that preserves its logical structure. The document parsing module 114 may be used for facilitating detailed analysis.

In at least one embodiment, the data store 116 is a repository providing non-transitory and persistent (non-volatile) storage for data objects. Examples of data stores include file systems, relational databases, non-relational databases, object-oriented databases, comma delimited files, and other files. In some implementations, the data store 116 comprises a distributed data store. In at least one embodiment, the data store 118 serves as a repository for storing a parsed and analyzed document data. In at least on embodiment, a representation of the document may be stored as a vector representation of the document in the data store 116. In at least one embodiment, the data store 116 may be referred to as a vector database. This storage may be used for ensuring that the data is readily accessible for further processing and analysis by machine learning models or other systems. The data store 116 provides a secure and organized space for document data. In at least one embodiment, data store 116 is a computing resource that stores processed document data for retrieval and analysis. In at least one embodiment, a neural network uses data store 116 to access historical document data for training purposes. In at least one embodiment, data store 116 retains parsed data from documents, such as, annual reports. In at least one embodiment, data store 116 archives extracted information from document, such as, research papers.

In at least one embodiment, machine learning model 120 is a computing resource that utilizes processed document data to perform predictive analysis. In at least one embodiment, a neural network uses machine learning model 120 to generate insights based on document content. In at least one embodiment, machine learning model 120 predicts, for example, market trends from financial reports. In at least one embodiment, machine learning model 120 forecasts, for example, sales performance from marketing data.

In at least one embodiment, document representation 122 is a computing resource that transforms document data into a format suitable for machine learning models. In at least one embodiment, a neural network uses document representation 122 to encode document features into vectors. In at least one embodiment, document representation 122 converts text attributes into numerical vectors. In at least one embodiment, document representation 122 encodes image features into vector formats.

In at least one embodiment, the document representation 122 is generated as a result of the parsing and analysis process. This representation includes a hierarchical structure that reflects the document's content and organization, making it suitable for use by machine learning models 120 to perform queries and derive insights from the document. In at least one embodiment, the document representation 122 is an output of the system, enabling advanced data analysis, In at least one embodiment, parts, methods, and/or systems described in connection with FIG. 1 are as further illustrated non-exclusively in any of FIGS. 1-8.

Figure 2:
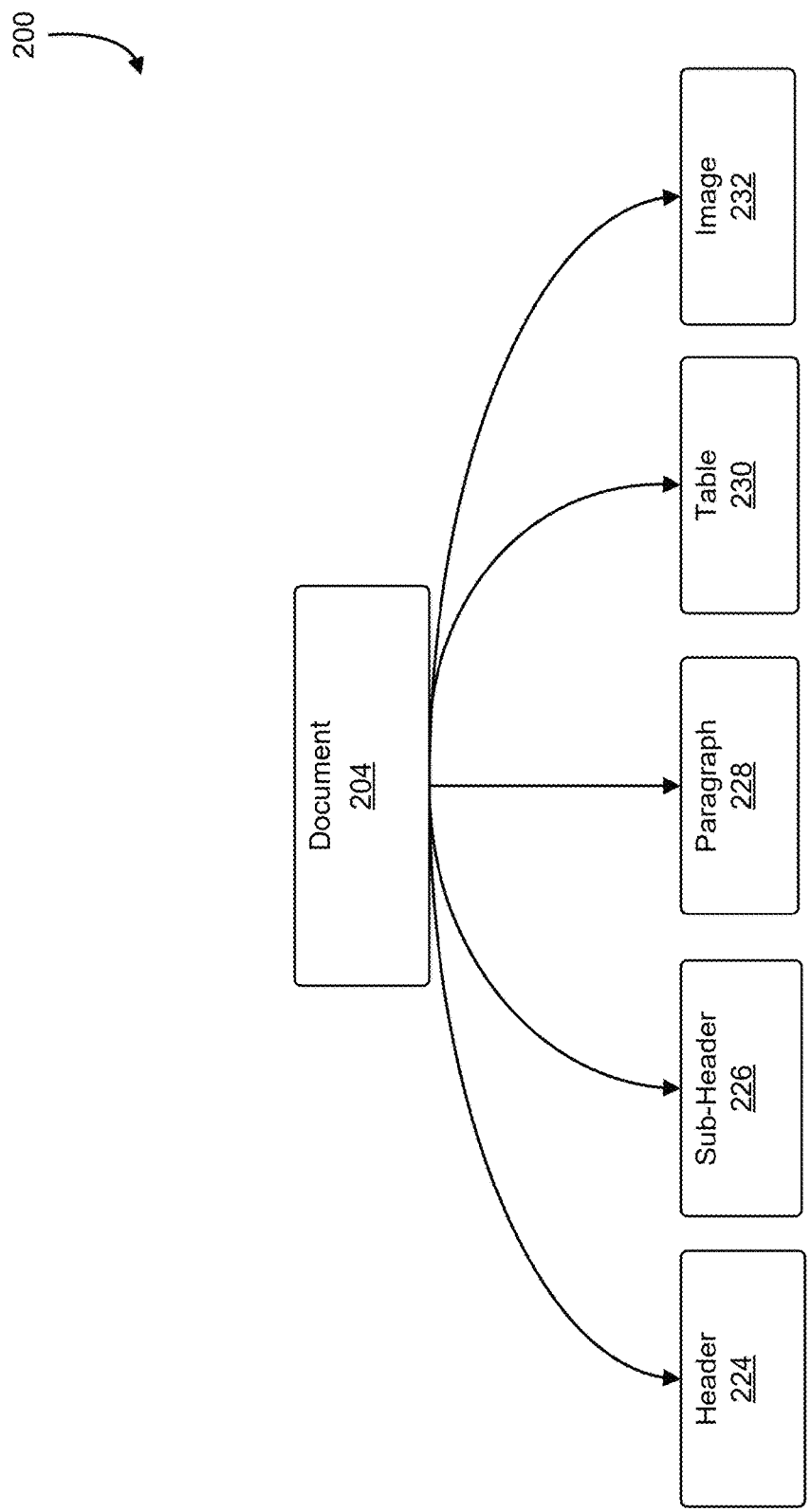
FIG. 2 illustrates an example an example of different types of elements that may be found within a document, in accordance with an embodiment.

FIG. 2 illustrates an example 200 of different types of elements that may be found within a document 204. As illustrated in FIG. 2, the example 200 may include document 204 that has been analyzed by, for example, analysis module 106 in FIG. 1, of a document parsing system 240, not shown in the FIG. 2, to identify and differentiate between various elements, such as a header 224, sub-header 226, paragraph 228, table 230, and an image 232, tables, based on their formatting attributes. The document 204 may be similar to the document 104 in FIG. 1.

In at least one embodiment, document parsing system 240, similar to document parsing system 140 in FIG. 1, may be designed to preserve the hierarchical structure of documents such as document 204. This system analyzes documents to identify formatting attributes, calculates statistical measures, and determines correlations between these measures and element types. The document parsing system 240 then establishes hierarchical relationships between element types, parses the document into chunks, generates a hierarchical representation, and stores this representation as a vector for querying by machine learning models. The representation includes metadata for each element, such as element types, font size, color, boldness, italics, page number, position within a page, and hierarchical relationships.

In at least one embodiment, the document 204 represents the initial input document that the system processes. The system 240 includes computing resources to receive and prepare the document 204 for analysis. A neural network uses this document 204 to identify formatting attributes, such as font size and style, which may be used for distinguishing between different elements. For example, the document parsing system 240 can process a document to identify its structural components or analyze a document to distinguish between different text styles.

In at least one embodiment, a header 224, which may also be referred to a heading herein, refers to sections of the document identified as headers. The document parsing system 240 may utilize computing hardware to recognize headers based on formatting attributes such as boldface and font size. In at least one embodiment, a neural network uses this information to categorize the header as a distinct element type. For instance, the system can identify chapter titles in a book or section headings in a report, ensuring these are stored with metadata indicating their hierarchy relative to other elements in the document 204, such as sub-header, and the position of this header 224. In at least one embodiment, an emphasis to element type can be expressed with a modification to font text that includes, but is not limited to, italics, boldface (bold), all-capital letters, color, or underline or even a different font (e.g., Courier, Times New Roman, etc.).

In at least one embodiment, a sub-header 226 refers to the document's sub-header sections. This document parsing system 240 uses computing resources to detect sub-headers by analyzing their relative size and style compared to headers. In at least one embodiment, a neural network uses this data to establish a hierarchical relationship between headers and sub-headers. Examples include identifying subsections within a chapter or sub-categories in a technical document, with metadata capturing their hierarchical level and formatting details.

In at least one embodiment, a paragraph 228 represents the main body text of the document. The system 340 utilizes computing hardware to analyze text blocks for consistent formatting attributes, such as font size and line spacing. In at least on embodiment, a neural network processes this information to classify paragraphs. The paragraph 228 may include both character and paragraph formatting. For example, the system can parse narrative text in a novel or descriptive sections in a user manual, storing metadata about their position and style.

In at least one embodiment, a table 230 refers to tabular data within the document 204. In at least one embodiment, document parsing system 240 employs computing resources to identify tables based on grid patterns and alignment. In at least one embodiment, a neural network uses this recognition to extract structured data from tables. Examples may include patient outcomes/data in a clinical trial or experimental results in a scientific paper, with metadata detailing their structure and location.

In at least one embodiment, an image 232 refers to the document's graphical content. In at least one embodiment, document parsing system 240 uses computing hardware to detect images by analyzing pixel patterns and metadata. In at least one embodiment, a neural network uses this detection to categorize images as separate elements. For instance, the document parsing system 240 can identify diagrams in a technical document or photographs in a magazine article, storing metadata about their size and placement.

In at least one embodiment, the document parsing system 240 calculates statistical measures of formatting attributes to determine correlations with element types, such as header 224, sub-header 226, paragraph 228, table 230, and image 232. In at least one embodiment, this process involves using computing resources to compute metrics, such as, mean, median, and mode. In at least one embodiment, a neural network leverages these metrics to refine element classification.

For example, the system can differentiate between major and minor headings or identify emphasis in text through italicization, with metadata reflecting these statistical insights.

In at least one embodiment, the document parsing system 240 determines hierarchical relationships between element types based on identified correlations. In at least one embodiment, this involves using computing hardware to map relationships such as parent-child structures between headers and sub-headers. In at least one embodiment, the document parsing system 240 may calculate a mean size and maximum size for a character to determine whether the characters are a header, such as header 224. In at least one embodiment, the document parsing system 240 may use this mean and maximum size of characters to determine a hierarchy and/or whether elements are a header or sub-header in a document. In at least one embodiment, a neural network applies these relationships to organize document content logically. Examples include structuring a legal document by sections and clauses or organizing a research paper by chapters and sub-sections, with metadata capturing these relationships.

In at least one embodiment, the system may determine the hierarchical ordering of elements within a document by executing instructions that perform a comparison between a measurement associated with a type of element and an additional measurement correlated to an additional type of element. This comparison indicates that the type and the additional type correspond to different hierarchical levels within the document's structure. For example, headings in a document may be identified as a higher hierarchical level compared to subheadings, which are further distinguished from paragraph text. In another example, the system may differentiate between main sections and subsections, ensuring that elements such as "Introduction" and "Conclusion" are accurately categorized according to their respective levels within the document.

In at least one embodiment, the document parsing system 240 parses the document into chunks using the established hierarchical relationships. In at least one embodiment, this process uses computing resources to divide the document into sections while preserving context. In at least one embodiment, a neural network uses these chunks and metadata associated with the various chunks (e.g., metadata of headers) to facilitate efficient data retrieval. For instance, the system can segment a textbook into chapters or a technical manual into procedures, with metadata ensuring the integrity of these chunks.

In at least one embodiment, the document parsing system 240 separates the document into chunks by analyzing the document's structure, such as headings, subheadings, and paragraphs, to maintain the context of each chunk. This ensures that when a natural language processing algorithm is applied, it can accurately interpret and retain the hierarchical relationships within the document. In at least one embodiment, the document parsing system 240 utilizes a natural language processing algorithm that processes each chunk individually while preserving its contextual metadata, such as font size and style, to ensure that the semantic meaning and document structure are maintained throughout the parsing process. For example, a heading with a larger font size is recognized as a parent node, and its associated text is processed as child nodes, maintaining the document's logical flow.

In at least one embodiment, the document parsing system 240 generates a representation of the document, similar to document representation 122 in FIG. 1, that includes a hierarchical structure. This involves using computing hardware to create a structured model of the document's content. A neural network uses this model to enhance data accessibility and interpretation. Examples include creating a tree diagram of a document's structure or generating an outline for a presentation, with metadata detailing each element's role.

In at least one embodiment, the document parsing system 240 stores the hierarchical representation as a vector usable by a machine learning model. In at least one embodiment, this process uses computing resources to encode the document's structure into a vector format. In at least one embodiment, a neural network uses these vectors to perform queries on the document. For example, the system can enable search functionality in a digital library or support data analysis in a large language model (LLM), with metadata providing context for these operations.

In at least one embodiment, the document parsing system 240 enhances document processing by maintaining metadata about the hierarchy and relationships between sections. This involves using computing hardware to store metadata alongside the document's vector representation. In at least one embodiment, a neural network uses this metadata to improve query accuracy and relevance. Examples include tracking changes in document versions or annotating sections with additional context, ensuring comprehensive metadata management.

In at least one embodiment, the document parsing system 240 is applied to various document types, demonstrating versatility in handling diverse formats. This involves using computing resources to adapt processing techniques to different document structures. In at least one embodiment, a neural network uses this adaptability to optimize performance across formats In at least one embodiment, the system can process both structured spreadsheets and unstructured text files or handle multilingual documents with varying character sets, with metadata supporting these diverse applications. In at least one embodiment, the document parsing system 240 supports dynamic parsing based on user requirements, allowing customization of how documents are processed. This involves using computing resources to adjust parsing strategies according to specific needs. In at least one embodiment, a neural network facilitates this flexibility, enabling tailored document analysis. Examples include prioritizing certain sections or focusing on specific data points for data analysis, with metadata reflecting these customizations.

In at least one embodiment, the system enables parsing JSON data by allowing users to specify parsing requirements via a user interface. For example, one user might use the interface to indicate that certain types of data are of primary importance, while another user might prioritize different data elements. This capability distinguishes the system from traditional parsing methods, such as those used for documents, by offering a uniform foundation for document analysis that can be tailored to meet the unique needs of different users.

In at least one embodiment, the system includes executable instructions that cause the computer system to store the parsed document as a vector representation. These instructions further enable the system to receive a query from a requestor, who specifies their requirements through the user interface. For instance, one requestor might request a query focusing on specific data patterns, while another might query for different criteria. This adaptability allows users to utilize the parsed data in ways that are more precise, efficient, and relevant to their specific needs.

In at least one embodiment, the parsing techniques include the integration of AI. By incorporating AI, the system can further refine and adapt the parsing process to accommodate evolving user requirements, enhancing the flexibility and utility of the parsed information. For example, AI could dynamically adjust the parsing criteria based on historical user interactions, optimizing the output for each unique query. In at least one embodiment, the system transforms static data into a dynamic resource tailored to diverse user requirements.

In at least one embodiment, parts, methods, and/or systems described in connection with FIG. 2 are as further illustrated non-exclusively in any of FIGS. 1-8.

Figure 3:
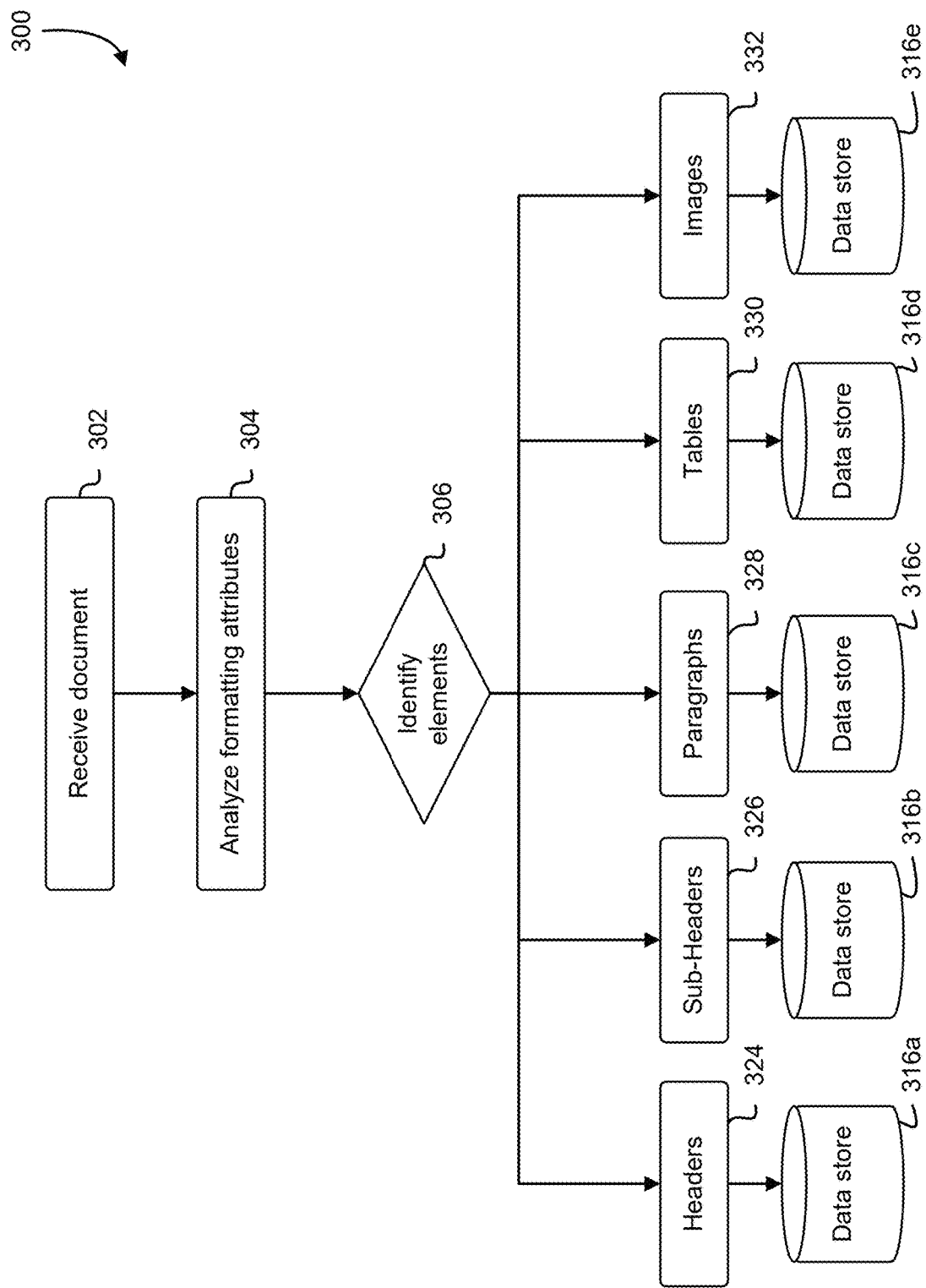
FIG. 3 is a flowchart of document analysis to identify and differentiate between various elements of the document, in accordance with an embodiment.

FIG. 3 is a flowchart of document analysis to identify and differentiate between various elements of the document, in accordance with an embodiment. In at least one embodiment, system 300 describes a method for analyzing and processing documents to extract structured information. In at least one embodiment, system 300 begins with receiving a document, analyzing its formatting attributes, and identifying various elements such as headers, sub-headers, paragraphs, tables, and images.

In at least one embodiment, in 302, one or more processors of a computing system receives a document. It describes a computing resource responsible for accepting input documents. In at least one embodiment, this resource is utilized by a neural network to initiate the document processing workflow. In at least one embodiment, examples include receiving files via an API or uploading documents through a user interface.

In at least one embodiment, in 304, one or more processors of a computing system analyze formatting Attributes of a document. This describes a computing resource that examines the document's formatting details. In at least one embodiment, this resource is used by a neural network to determine the structure and style of the document. In at least one embodiment, examples include analyzing font sizes to distinguish headings or detecting color patterns to identify sections.

In at least one embodiment, in 306, one or more processors of a computing system identify elements of the document. This describes a computing resource that categorizes document components. In at least one embodiment, this resource is used by a neural network to differentiate between headers, sub-headers, paragraphs, tables, and images. In at least one embodiment, examples include using machine learning to classify text blocks or employing pattern recognition to detect tables.

In at least one embodiment, in 324, one or more processors of a computing system identify headers in a document, such as header 224 in FIG. 2. In 316*a*, describes a data store, such as a vector database, for storing identified header elements. In at least one embodiment, this data store 316*a* is used by a neural network to preserve document hierarchy. In at least one embodiment, examples include storing chapter titles from a book or section headings from a report. A data store, such as illustrated in 316*a*, is presented for illustration purposes, and is not limited to one data store per document element (e.g., header, sub-header, or paragraph). In at least one embodiment, this data store may include a plurality of data stores.

In at least one embodiment, in 326, one or more processors of a computing system identify sub-headers such as sub-header 226 in FIG. 2. In 316*b*, describes a data store, such as a vector database, for storing identified sub-header elements. In at least one embodiment, this data store is used by a neural network to maintain document structure. In at least one embodiment, examples include storing subsection titles from a technical manual or subheadings from an article.

In at least one embodiment, in 328, one or more processors of a computing system identify paragraphs, such as paragraph 228 in FIG. 2. In 316*c*, describes a data store for storing identified paragraph elements. In at least one embodiment, this data store is used by a neural network to retain textual content. In at least one embodiment, examples include storing narrative text from a novel or descriptive content from a research paper.

In at least one embodiment, in 330, one or more processors of a computing system identify tables, such as table 230 in FIG. 2. In 316*d*, describes a data store for storing identified table elements. In at least one embodiment, this data store is used by a neural network to organize tabular data. In at least one embodiment, examples include storing experimental results from a scientific study.

In at least one embodiment, in 332, one or more processors of a computing system identify images, such as image 232 in FIG. 2. In 316*e*, describes a data store for storing identified image elements. In at least one embodiment, this data store is used by a neural network to manage visual content. In at least one embodiment, examples include storing diagrams from a technical document or photographs from a presentation.

In at least one embodiment, parts, methods, and/or systems described in connection with FIG. 3 are as further illustrated non-exclusively in any of FIGS. 1-8.

Figure 4:
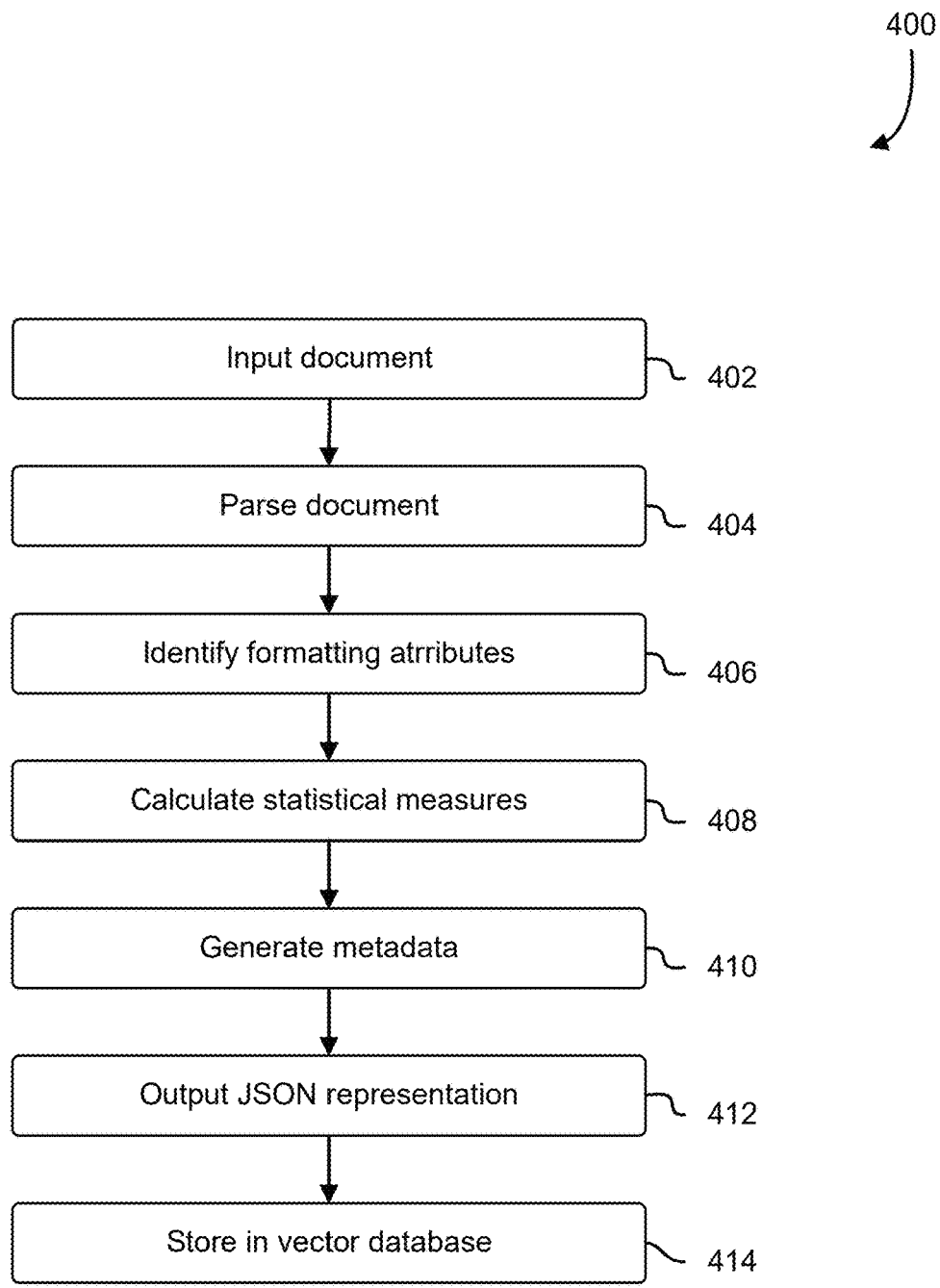
FIG. 4 illustrates an example of metadata generation process from a document, in accordance with an embodiment.

FIG. 4 is a flowchart illustrating an example of a metadata generation process, in accordance with an embodiment. Some or all of the process 400 (or any other processes described, or variations and/or combinations of those processes) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as the computing device 800 of FIG. 8.

In at least one embodiment, process 400 describes a method for generating metadata from a document. In at least one embodiment, process 400 includes steps such as parsing the document, identifying formatting attributes, calculating statistical measures, generating metadata, outputting a JSON representation, and storing the data in a vector database.

In 402, in at least one embodiment, one or more processors of the hierarchical document parsing system, such a document parsing system 140 in FIG. 1, or alternatively known as a computing system or system, perform instructions to receive a document (e.g., a PDF document), such as document 104 in FIG. 1. In at least one embodiment, the document parsing system 140 initiates the metadata generation process by accepting the document as input.

In 404, in at least one embodiment, one or more processors of the hierarchical document parsing system perform instructions to parse an input document. In at least one embodiment, this hardware enables the neural network to break down the document into its constituent elements. In at least one embodiment, an example involves extracting text, images, and tables from the document.

In 406, one or more processors of the hierarchical document parsing system analyzes the parsed document to identify formatting attributes. In at least one embodiment, the neural network uses this resource to detect font sizes, colors, and styles. In at least one embodiment, an example includes recognizing boldface headings and italicized subheadings within the document.

In at least one embodiment, document parsing system 140 analyzes the document to identify various formatting attributes of its elements. In some embodiments, these attributes of font size, color, and style may be used for distinguishing between different types of content such as headers, subheaders, and body text. In at least one embodiment, the system scans the entire document to gather data on these attributes, creating a comprehensive profile of the document's structure.

In 408, in at least one embodiment, one or more processors of the hierarchical document system perform instructions to calculate statistical measures such as mean, median, and mode for each identified formatting attribute. In at least one embodiment, a neural network utilizes this hardware to determine mean, median, and mode of font sizes. In at least one embodiment, these statistical measures may be used to determine characteristics of different document elements. In at least one embodiment, an example includes calculating the average font size used in the document's body text. In at least one embodiment, for example, a higher mean font size may indicate a header, while a lower mean font size may suggest body text. In at least one embodiment, by comparing these statistical measures across the document, the system can accurately classify and differentiate between various elements, preserving the hierarchical structure essential for effective data extraction and interpretation by machine learning models.

In 410, in at least one embodiment, one or more processors of the hierarchical document system perform instruction to generate metadata based on the calculated statistical measures. In at least one embodiment, a neural network employs this resource to create a structured representation of the document's content. In at least one embodiment, an example includes generating metadata that categorizes sections of the document by their formatting attributes.

In at least one embodiment, the metadata is generated by associating these statistical measures with specific document elements, thereby preserving the hierarchical structure of the document. In at least one embodiment, this metadata includes information about the relationships between different sections, allowing for precise chunking of the document. In at least one embodiment, the metadata is stored in a structured format, such as JSON, which can be used by machine learning models to perform queries that may leverage the document's original hierarchy and context.

In 412, in at least one embodiment, one or more processors of the hierarchical document system perform instructions to output the generated metadata as a JSON file. In at least one embodiment, the neural network uses this hardware to format the metadata for storage and retrieval. In at least one embodiment, an example includes creating a JSON file that represents the hierarchical structure of the document.

In 414, in at least one embodiment, one or more processors of the hierarchical document system perform instructions to store the JSON representation in a vector database. In at least one embodiment, the neural network utilizes this resource to enable efficient querying and retrieval of document information. In at least one embodiment, an example includes storing the JSON data in a database for use in machine learning applications.

In at least one embodiment, the process analyzes a document to identify formatting attributes of elements of the document. In at least one embodiment, the process calculates a statistical measure of each of the formatting attributes. In at least one embodiment, the process identifies a correlation between the statistical measure and an element type of each of the elements.

In at least one embodiment, the process determines a hierarchical relationship between the element types based, at least in part, on the correlation. In at least one embodiment, the process parses the document into chunks using the hierarchical relationship. In at least one embodiment, the process generates a representation of the document that includes a hierarchical structure.

In at least one embodiment, the process stores the representation as a vector usable by a machine learning model to perform a query on the document. In at least one embodiment, the representation includes metadata for each element, the metadata including one or more of element types, font size, color, boldness, italics, page number, position within a page of the document, and hierarchical relationships between elements of the document.

In at least one embodiment, parts, methods, and/or systems described in connection with FIG. 4 are as further illustrated non-exclusively in any of FIGS. 1-8.

Figure 5:
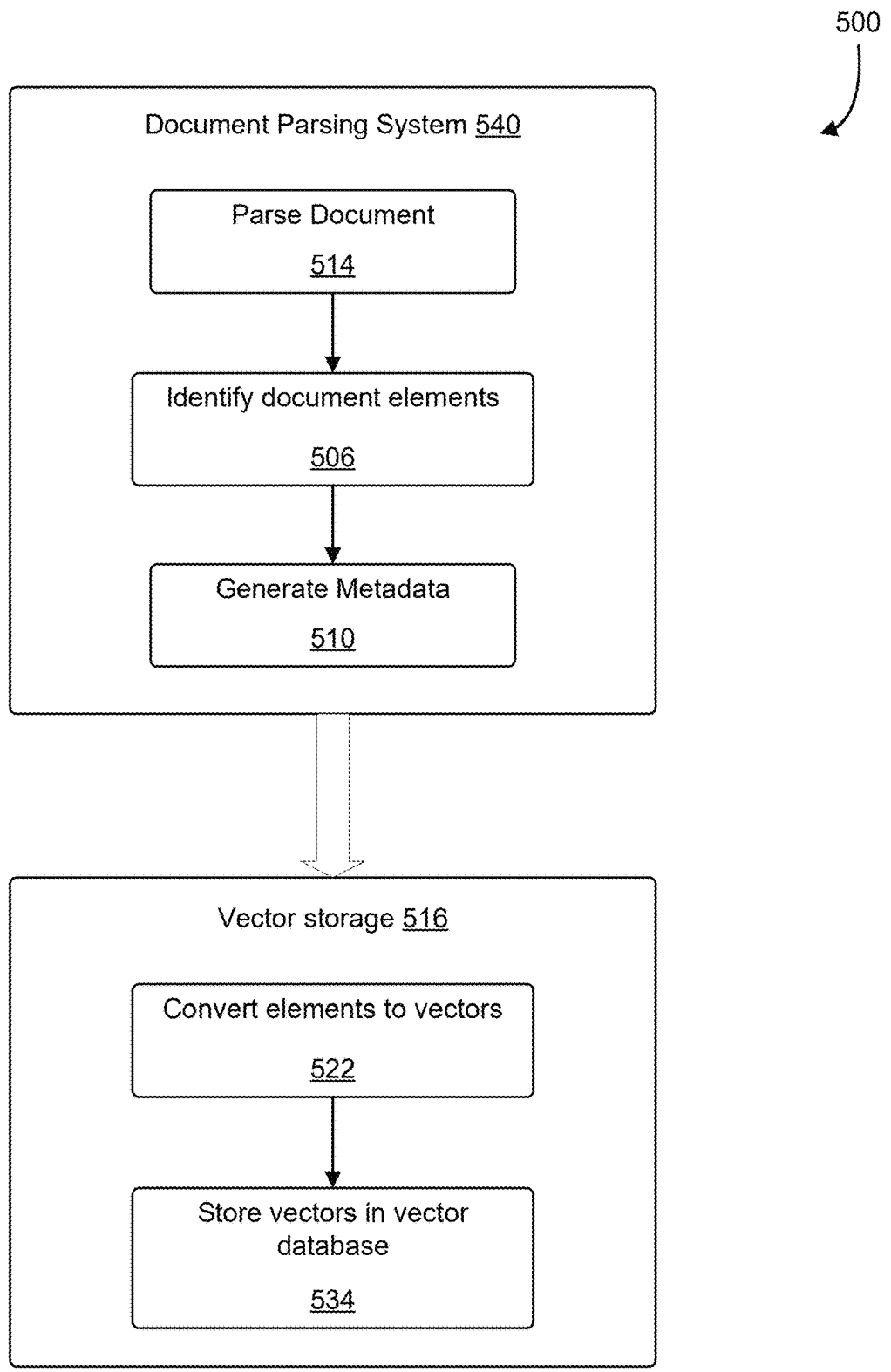
FIG. 5, illustrates an example of vector representation to show how the parsed document is stored as vectors in a database in accordance with an embodiment.

FIG. 5 illustrates an example of vector representation to show how the parsed document is stored as vectors in a database, in accordance with an embodiment. In at least one embodiment, process 500 describes a method for parsing documents and storing parsed data as vectors in a database.

As illustrated in FIG. 5, the environment 500 may include a document parsing system 540 and a vector storage 516, which work together to convert document elements into vector representations for efficient storage and retrieval.

In at least one embodiment, document parsing system 540 is responsible for analyzing document content to identify and classify various elements. In at least one embodiment, this system utilizes neural networks to extract text and structural information from diverse document formats, such as PDFs and Word documents. In at least one embodiment, examples include parsing PDF files to identify text blocks and extracting data from Word documents.

In at least one embodiment, a processor of a hierarchical document parsing system, such as document parsing system 140 in FIG. 1, performs instructions to parse document(s) 514 to analyze document content. In at least one embodiment, a neural network is to extract text and structural information from various document formats. In at least one embodiment, examples include parsing PDF files to identify text blocks and extracting data from Word documents.

In at least one embodiment, this processor of a hierarchical document parsing system performs instructions to identify document elements 506. This involves computing resources that classify different parts of a document. In at least one embodiment, these resources enable a neural network to distinguish between headings, paragraphs, and tables. In at least one embodiment, examples include identifying bold text as headings and recognizing bullet points as list items.

In at least one embodiment, this processor of a hierarchical document parsing system performs instructions to generate metadata 510. This system may include computing hardware that creates metadata for parsed document elements. In at least one embodiment, this hardware allows a neural network to tag elements with attributes like font size and color. In at least one embodiment, examples include tagging a section as a subheading based on its font style and associating a table with its caption.

In at least one embodiment, vector storage 516 is used for converting document elements into vector representations and storing them. Vector storage 516 is similar to data store 116 in FIG. 1 and data store 316a-e in FIG. 3. In at least one embodiment, this storage system uses neural networks to encode textual and structural information into numerical vectors, also known as vector embeddings. In at least one embodiment, examples include converting a paragraph into a dense vector based on its semantic content and encoding a table's layout as a vector. In at least one embodiment, vectors are extracted from the plaintext data or image data. In at least one embodiment, the vectors are based on features of plaintext, or images extracted from encoding layers. In at least one embodiment, a feature extraction module of the document parsing system 140 may include an encoder that encodes input data, such as documents 104, to a machine learning model 120 into one or more feature vectors.

In at least one embodiment, this processor of a hierarchical document parsing system performs instructions to convert elements of a parsed document into vectors 522. This may include computing resources that transform document elements into vector representations. In at least one embodiment, these resources enable a neural network to encode textual and structural information into numerical vectors. In at least one embodiment, examples include converting a paragraph into a dense vector based on its semantic content and encoding a table's layout as a vector.

In at least one embodiment, this processor of a hierarchical document parsing system performs instructions to store vectors in vector database 534. This may involve computing hardware that stores vector representations in a database. In at least one embodiment, this hardware allows a neural network to efficiently retrieve and query stored vectors. In at least one embodiment, examples include storing vectors for quick access during search operations and maintaining a database of vectors for machine learning tasks.

In at least one embodiment, parts, methods, and/or systems described in connection with FIG. 5 are as further illustrated non-exclusively in any of FIGS. 1-8.

Figure 6:
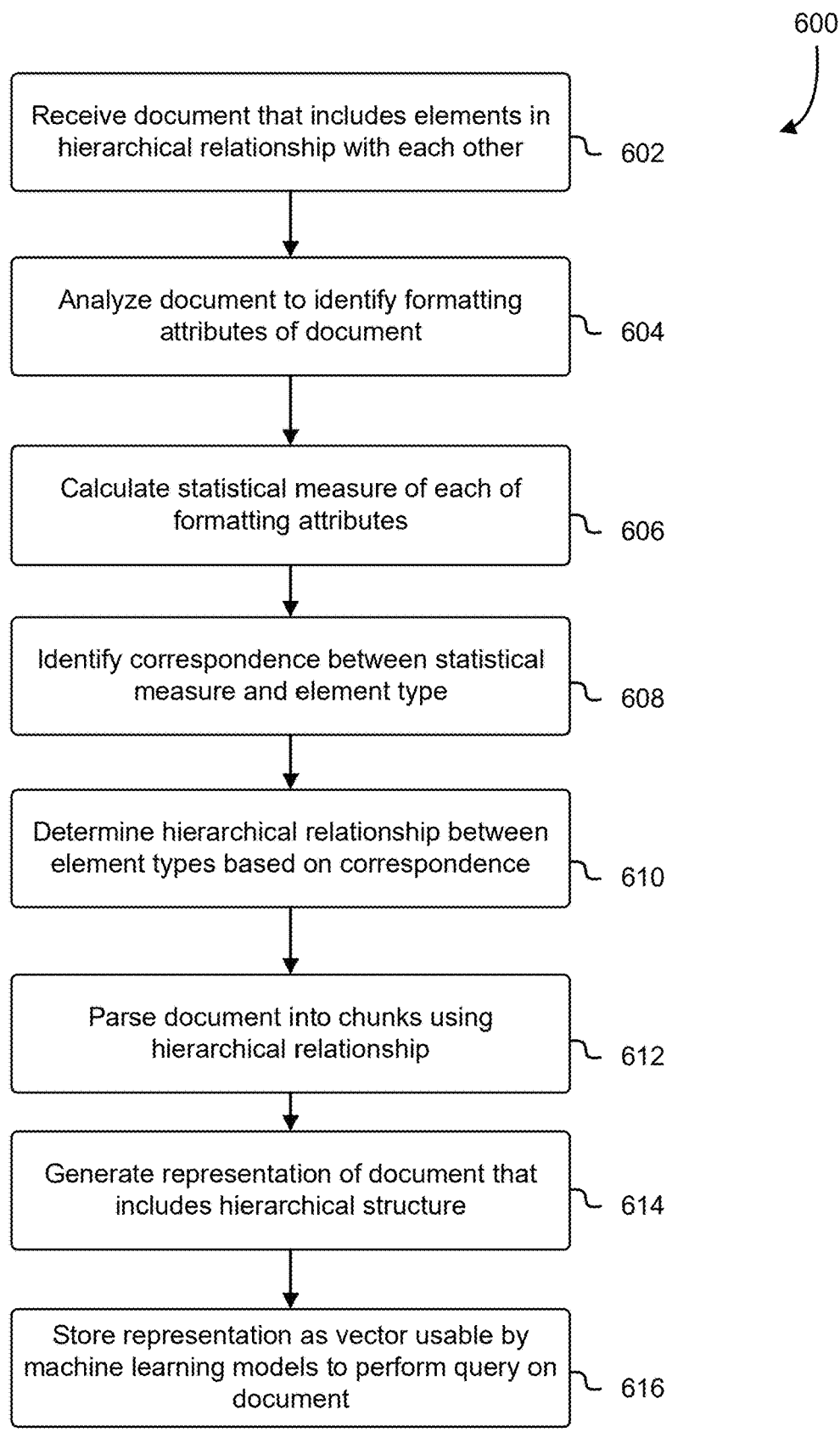
FIG. 6 is a flowchart of a document parsing process, in accordance with an embodiment.

FIG. 6 is a flowchart illustrating a document parsing process, in accordance with an embodiment. Some or all of the process 600 (or any other processes described, or variations and/or combinations of those processes) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as the computing device 800 of FIG. 8. The process 600 includes a series of operations wherein the system performing process 600 may receive a document including elements arranged in a hierarchical structure, analyze the document to identify formatting attributes, calculate statistical measures of the formatting, identify correlations between the statistical measures and the formatting, determine a hierarchical relationship between elements in the document, parse the document into chunks, generate a representation of the document, and store the representation in a data format usable for a machine learning algorithm.

In 602, in at least one embodiment, one or more processors of the hierarchical document parsing system perform instructions to receive a document that includes elements arranged in a hierarchical relationship with each other. This step involves the initial intake of the document data, which is structured in such a way that various elements are organized in a manner that reflects their interdependencies and nested relationships.

In 604, in at least one embodiment, one or more processors of the hierarchical document parsing system perform instructions to analyze the document to identify its formatting attributes. This analysis involves examining the document's structure to determine characteristics such as font size, style, indentation, and other visual or structural markers that define how the document is formatted. These attributes may be used for understanding the document's layout and organization.

In 606, in at least one embodiment, one or more processors of the hierarchical document parsing system perform instructions to calculate a statistical measure of each identified formatting attribute. This calculation involves quantifying the attributes to create a measurable representation of the document's formatting. The statistical measures provide a basis for comparing and contrasting different elements within the document.

In 608, in at least one embodiment, one or more processors of the hierarchical document parsing system perform instructions to identify correspondence between the statistical measures and the element types within the document. This step involves mapping the quantified formatting attributes to specific types of elements, such as headings, paragraphs, or lists, based on their statistical profiles. This correspondence may be used for categorizing the document's content accurately.

In 610, in at least one embodiment, one or more processors of the hierarchical document parsing system perform instructions to determine the hierarchical relationship between element types based on the identified correspondence. This determination involves establishing the order and nesting of elements, reflecting their logical and structural relationships within the document. The hierarchical relationship is usable to understanding the document's overall structure.

In 612, in at least one embodiment, one or more processors of the hierarchical document parsing system perform instructions to parse the document into chunks using the determined hierarchical relationship. Parsing involves breaking down the document into smaller, manageable sections or chunks that align with an established hierarchy. This process may facilitate easier manipulation and analysis of the document's content.

In 614, in at least one embodiment, one or more processors of the hierarchical document parsing system perform instructions to generate a representation of the document that includes its hierarchical structure. This representation may be a structured format that encapsulates the document's content and its hierarchical organization. In at least some embodiments, the structured format may be usable for further processing and analysis, for example, to be input for machine learning models performing inferences and/or training operations.

In 616, in at least one embodiment, one or more processors of the hierarchical document parsing system perform instructions to store the representation as a vector usable by machine learning models to perform queries on the document. This storage may involve converting the hierarchical representation into a vector format that can be efficiently utilized by machine learning algorithms to conduct various analyses, such as information retrieval or content classification.

Note that one or more of the operations performed in 602-16 may be performed in various orders and combinations, including in parallel. In at least one embodiment, parts, methods, and/or systems described in connection with FIG. 6 are as further illustrated non-exclusively in any of FIGS. 1-8.

FIG. 7A illustrates an example of a document parser applied to a complex document to extract relevant information for a generative AI model, in accordance with an embodiment. In at least one embodiment, example 700 is presented for illustrative purposes related to a system for processing documents that include a plurality of elements in a hierarchical relationship. In at least one embodiment, this system receives an original document, such as FIG. 7A, and analyzes it to identify formatting attributes and calculate statistical measures, such as, mean, median, and mode. In at least one embodiment, these measures are used to determine the hierarchical relationship between elements, allowing the document to be parsed into context-preserving chunks.

In at least one embodiment, the document parser receives a document, such as FIG. 7A, which includes a plurality of elements in a hierarchical relationship. In at least one embodiment, the parser analyzes the document to identify formatting attributes, such as font size and boldness, and calculates statistical measures like mean, median, and mode. In at least one embodiment, these measures help identify correspondences between statistical measures and element types, determining the hierarchical relationship between elements.

In at least one embodiment, elements of the original document such as illustrated at 724, identified as a header, similar to header 224 in FIG. 2, is measured by the document parser to have larger font size and boldface formatting, indicating its role as a primary heading. In at least one embodiment, this header is used by the system to categorize the document's main topic, such as "Animals Large & Extra Large," facilitating efficient data retrieval and organization.

In at least one embodiment, elements of the original document such as illustrated at 726, identified as a sub-header, similar to sub-header 226 in FIG. 2, is measured by the document parser to have a slightly smaller font size and bold formatting compared to the header, indicating its role as a secondary heading. In at least one embodiment, this sub-header provides an overview of the content, such as "Overview," guiding the neural network in parsing the document into meaningful sections for further analysis.

In at least one embodiment, elements of the original document such as illustrated at 728, identified as a paragraph, similar to paragraph 228 in FIG. 2, is measured by the document parser to have the smallest font size and regular formatting, indicating its role as body text. In at least one embodiment, this paragraph contains detailed information, such as descriptions of animal species, which the neural network uses to generate a structured representation of the document, storing it as a vector for machine learning queries.

In at least one embodiment, parts, methods, and/or systems described in connection with FIG. 7A are as further illustrated non-exclusively in any of FIGS. 1-8.

FIG. 7B an example of a JSON representation of the complex document to extract relevant information for a generative AI model, in accordance with an embodiment. In at least one embodiment, FIG. 7B illustrates example 700, which describes a hierarchical structure of document elements. In at least one embodiment, example 700 includes a primary heading with a style characterized by bold and non-italicized text, utilizing the "Helvetica-Bold" font with a mapped font size labeled as "xlarge." For example, this heading may be associated with a mean and max size of 18.0, indicating its prominence within the document.

In at least one embodiment, the text "Animals Large & Extra Large" at 724 in FIG. 7A corresponds to the primary heading in FIG. 7B. In at least one embodiment, a processor of a hierarchical document parsing system, similar to the document parsing system 140 in FIG. 1, performs instruction to utilize computing resources to identify and categorize text based on statistical measures of the characters. In at least one embodiment, a neural network processes this information to classify information in the document (e.g., animals "X Large" and "Large") in paragraphs of the document as opposed to a header, facilitating data retrieval and analysis. In at least one embodiment, this classification provides structured data that is accessible or more readily ascertained in response to a user's query. For example, providing relevant information in queries related to wildlife research and conservation efforts in ecological studies.

In at least one embodiment, information in the "Overview" of the original document at 726 in FIG. 7A may be extracted and represented as a child element in FIG. 7B of a hierarchy of elements in the document. In at least one embodiment, a processor of this hierarchical document parsing system performs instructions to employ computing resources and/or hardware to present an introductory summary of the document's content. In at least one embodiment, a neural network uses this summary to guide users in navigating the document efficiently, enhancing user experience by highlighting key sections. As an example, this approach may be utilized in educational platforms to provide concise overviews of complex topics.

In at least one embodiment, the process of receiving a document involves analyzing the document to identify a plurality of formatting attributes of the elements, as shown in FIG. 7B. In at least one embodiment, statistical measures such as mean and max sizes are calculated for these attributes, enabling the identification of correspondences between statistical measures and element types. In at least one embodiment, this process determines the hierarchical relationship between element types, which may be used for parsing the document into context-preserving chunks.

In at least one embodiment, the parsed document is represented in a hierarchical structure, as depicted in FIG. 7B, and stored as a vector in a data store, such as data store 116 in FIG. 1, data stores 316a-e in FIG. 3, and vector storage 516 in FIG. 5. In at least one embodiment, this representation includes metadata for each element, such as element types, font size, color, boldness, italics, page number, position within a page, and hierarchical relationships. In at least one embodiment, this metadata may be used for machine learning models to perform queries on the document according to its hierarchical structure.

In at least one embodiment, the representation of the document is encoded in JavaScript Object Notation (JSON), as illustrated in FIG. 7B. JSON may provide a flexible and structured format that facilitates the integration of document data with machine learning models. In at least one embodiment, this format is used to train models to understand and process complex document structures, enabling applications in various domains such as data analysis and automated report generation.

In at least one embodiment, parts, methods, and/or systems described in connection with FIG. 7B are as further illustrated non-exclusively in any of FIGS. 1-8.

Figure 8:
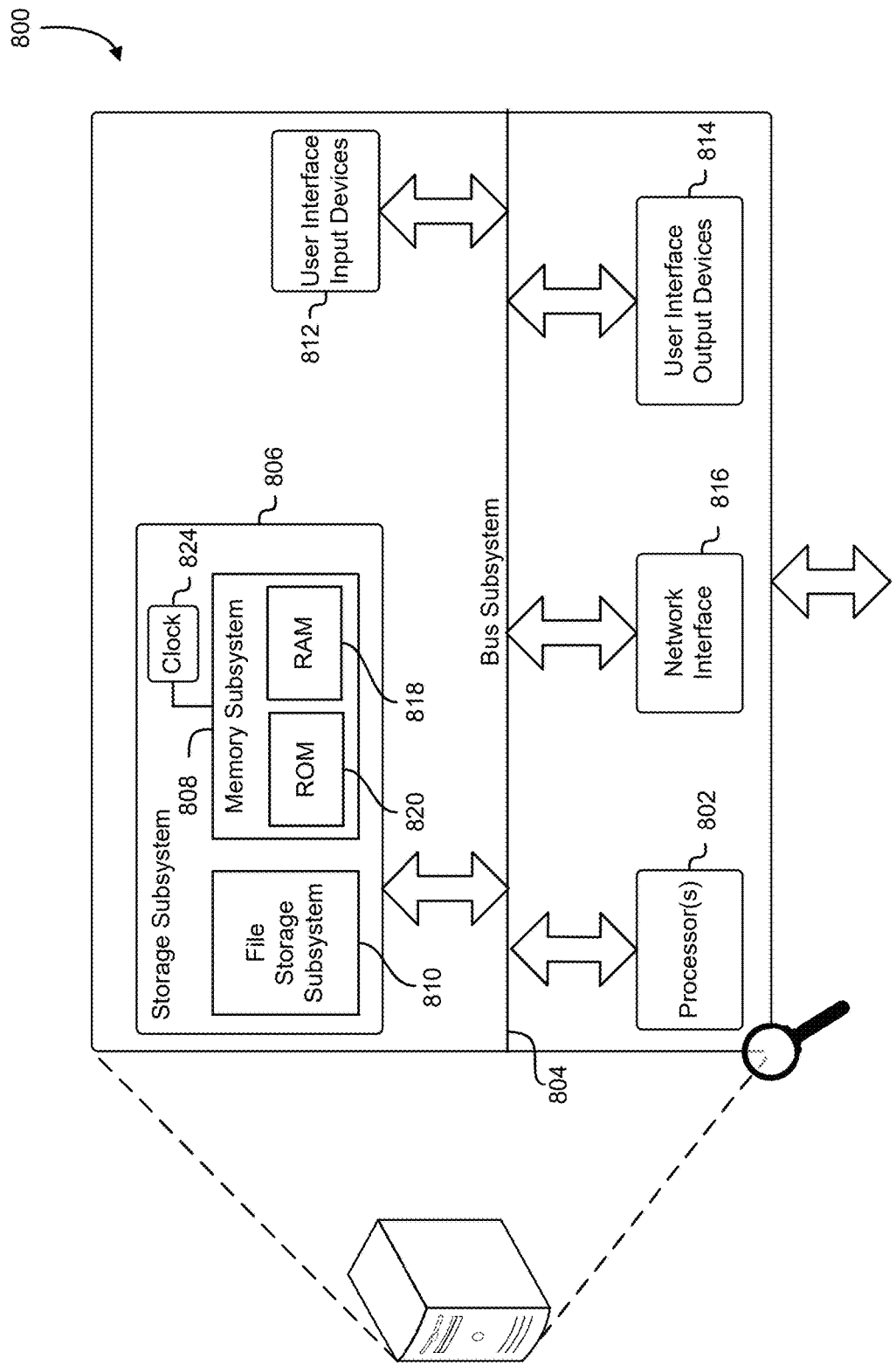
FIG. 8 illustrates a computing device that may be used in accordance with at least one embodiment/an environment in which various embodiments can be implemented.

FIG. 8 is an illustrative, simplified block diagram of a computing device 800 that can be used to practice at least one embodiment of the present disclosure. In various embodiments, the computing device 800 includes any appropriate device operable to send and/or receive requests, messages, or information over an appropriate network and convey information back to a user of the device. The computing device 800 may be used to implement any of the systems illustrated and described above. For example, the computing device 800 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 800 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 8, the computing device 800 may include one or more processors 802 that, in embodiments, communicate with and are operatively coupled to a number of peripheral subsystems via a bus subsystem. In some embodiments, these peripheral subsystems include a storage subsystem 806, comprising a memory subsystem 808 and a file/disk storage subsystem 810, one or more user interface input devices 812, one or more user interface output devices 814, and a network interface subsystem 816. Such storage subsystem 806 may be used for temporary or long-term storage of information.

In some embodiments, the bus subsystem 804 may provide a mechanism for enabling the various components and subsystems of computing device 800 to communicate with each other as intended. Although the bus subsystem 804 is shown schematically as a single bus, alternative embodiments of the bus subsystem utilize multiple buses. The network interface subsystem 816 may provide an interface to other computing devices and networks. The network interface subsystem 816 may serve as an interface for receiving data from and transmitting data to other systems from the computing device 800. In some embodiments, the bus subsystem 804 is utilized for communicating data such as details, search terms, and so on. In an embodiment, the network interface subsystem 816 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 816 is enabled by wired and/or wireless connections and combinations thereof.

In some embodiments, the user interface input devices 812 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 800. In some embodiments, the one or more user interface output devices 814 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 800. The one or more user interface output devices 814 can be used, for example, to present user interfaces to facilitate user interaction with applications performing processes described and variations therein, when such interaction may be appropriate.

In some embodiments, the storage subsystem 806 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 806. These application modules or instructions can be executed by the one or more processors 802. In various embodiments, the storage subsystem 806 additionally provides a repository for storing data used in accordance with the present disclosure. In some embodiments, the storage subsystem 806 comprises a memory subsystem 808 and a file/disk storage subsystem 810.

In embodiments, the memory subsystem 808 includes a number of memories, such as a main random-access memory (RAM) 818 for storage of instructions and data during program execution and/or a read only memory (ROM) 820, in which fixed instructions can be stored. In some embodiments, the file/disk storage subsystem 810 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 800 includes at least one local clock 824. The at least one local clock 824, in some embodiments, is a counter that represents the number of ticks that have transpired from a particular starting date and, in some embodiments, is located integrally within the computing device 800. In various embodiments, the at least one local clock 824 is used to synchronize data transfers in the processors for the computing device 800 and the subsystems included therein at specific clock pulses and can be used to coordinate synchronous operations between the computing device 800 and other systems in a data center. In another embodiment, the local clock is a programmable interval timer.

The computing device 800 could be of any of a variety of types, including a portable computer device, tablet computer, a workstation, or any other device described below. Additionally, the computing device 800 can include another device that, in some embodiments, can be connected to the computing device 800 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 800 may include any appropriate hardware, software, and firmware for integrating with a data store as needed to execute aspects of one or more applications for the computing device 800 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 800 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 800 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 800 may provide the content in one or more forms including, but not limited to, forms that are perceptible to the user audibly, visually, and/or through other senses. The handling of requests and responses, as well as the delivery of content, in an embodiment, is handled by the computing device 800 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 800 typically will include an operating system that provides executable program instructions for the general administration and operation of the computing device 800 and includes a computer-readable storage medium (e.g., a hard disk, random access memory (RAM), read only memory (ROM), etc.) storing instructions that if executed (e.g., as a result of being executed) by a processor of the computing device 800 cause or otherwise allow the computing device 800 to perform its intended functions (e.g., the functions are performed as a result of one or more processors of the computing device 800 executing instructions stored on a computer-readable storage medium).

In an embodiment, the computing device 800 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 800 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 800 is capable of storing, retrieving, and accessing structured or unstructured data. In an embodiment, computing device 800 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention, and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
receiving a document that includes a plurality of elements;
analyzing the document to identify a plurality of formatting attributes of the plurality of elements;
calculating a plurality of statistical measures of the plurality of formatting attributes occurring within the document;
identifying correspondences between the plurality of statistical measures and a plurality of element types of the plurality of elements, by at least:
mapping a statistical measure of a formatting attribute to a first element type of the plurality of element types based at least in part on how the plurality of elements is arranged within the document; and establishing a level of correlation between the first element type and a second element type of the plurality of the element types, the level of correlation indicating a hierarchical relationship between the first element type and the second element type within a document structure;

determining, based on the correspondences, a hierarchical relationship between or among the plurality of element types;

segmenting, using the hierarchical relationship, data from the document into chunks that preserve a context of the document; and storing, as a vector in a data store, a representation of a hierarchical structure of the document that corresponds to the hierarchical relationship, the vector usable by a computing device to perform a query on the data according to the hierarchical structure.

2. The computer-implemented method of claim 1, further comprising:

receiving, from a client device of a user, a request to query the document, the query comprising a requirement corresponding to a chunk of the data;

providing, to a machine learning model, input derived, at least in part, on the requirement and the vector; and providing, to the client device, response data derived from output of the machine learning model in response to the query.

3. The computer-implemented method of claim 1, wherein at least some of the plurality of statistical measures are calculated based, at least in part, on a size of each of the plurality of elements.

4. The computer-implemented method of claim 1, wherein at least some of the plurality of statistical measures are calculated based, at least in part, on a typographic style of each of the plurality of elements.

5. The computer-implemented method of claim 1, wherein the correspondences are identified based, at least in part, on content distribution between the plurality of elements.

6. The computer-implemented method of claim 1, further comprising generating, from the chunks, the representation of the hierarchical structure of the document that corresponds to the hierarchical relationship, wherein the representation generated in a format that maintains the hierarchical structure of the document.

7. The computer-implemented method of claim 1, wherein the document is segmented based at least on a requirement specified by a user via a user interface.

8. The computer-implemented method of claim 1, wherein the chunks are associated with metadata that includes position and context data of the chunks within the document.

9. A system, comprising:

one or more processors; and one or more non-transitory, computer-readable media comprising computer-executable instructions recorded thereon that, if executed by the one or more processors, cause the system to:

analyze a document to identify an attribute of an element of a plurality of elements in the document;

determine a measurement of the attribute;

identify a correspondence between the measurement and a type of the element by causing the system to:

map the measurement to a first element type of a plurality of element types of the element in the document based at least in part on how the plurality of elements is arranged within the document; and establish a level of correlation between the first element type and a second element type of the plurality of element types, the level of correlation indicating a hierarchical relationship between the first element type and the second element type within a document structure;

determine an ordering of the type based, at least in part, on the correspondence;

split data from the document into chunks, at least in part, in accordance with the ordering;

generate, based, at least in part, on the chunks, a representation of the document that specifies a structure of the document; and store the representation as a value usable by a computing device to perform a query on the document.

10. The system of claim 9, wherein the computer-executable instructions that cause the system to determine the measurement further include instructions that cause the system to calculate, from the attribute, one or more of:

a mean of the attribute, a median of the attribute, or a mode of the attribute.

11. The system of claim 9, wherein the computer-executable instructions that cause the system to determine the measurement include instructions that cause the system to identify at least one element within the document that has text formatting with a different emphasis from other text elements within the document.

12. The system of claim 9, wherein the computer-executable instructions that cause the system to determine the ordering include instructions that cause the system to perform a comparison of the measurement with an additional measurement correlated to an additional type of element in the document, the comparison indicating that the type and the additional type correspond to different hierarchical levels in the structure.

13. The system of claim 9, wherein the computer-executable instructions further include instructions that cause the system to:

receive a request to perform a query against the document, the request comprising a vector derived from metadata of the document and the structure of the document;

provide, as input, to a machine learning model:

a vector value representing chunked data stored in a vector data store; and the metadata associated with elements of the document; and provide, as a response to the query, information determined to be relevant to the query based on the structure and content of the document.

14. One or more non-transitory computer-readable storage media having stored thereon executable instructions that, if executed by one or more processors of a computer system, cause the computer system to at least:

analyze a document to identify:

a first formatting attribute of one or more elements of the document; and a second formatting attribute of one or more other elements of the document;

calculate a first statistical measure for the first formatting attribute and a second statistical measure for the second formatting attribute;

identify correspondences between the first statistical measure and a first element type of the one or more elements and between the second statistical measure and a second element type of the one or more other elements, by at least:
mapping the first statistical measure to the first element type and the second statistical measure to the second element type based at least in part on how the one or more elements is arranged within the document; and
establishing a level of correlation between the first element type and the second element type, the level of correlation indicating a hierarchical relationship between the first element type and the second element type within a document structure;
determine a hierarchical relationship between the first element type and the second element type based, at least in part, on the correspondences;
separate data from the document into a plurality of chunks according to the hierarchical relationship;
generate a representation of the document that includes a hierarchical structure; and
store the representation as a vector usable by a computing device to perform a query on the document.

15. The one or more non-transitory computer-readable storage media of claim 14, wherein the representation includes metadata for the elements of the document, the metadata including one or more of:
a page number of the document,
a position within a page of the document, or
hierarchical relationships between the elements of the document.

16. The one or more non-transitory computer-readable storage media of claim 14, wherein the computing device comprises a machine learning model.

17. The one or more non-transitory computer-readable storage media of claim 16, wherein the executable instructions further include instructions that further cause the computer system to provide an interface for querying the machine learning model to identify and retrieve a particular chunk of the document based on hierarchical context.

18. The one or more non-transitory computer-readable storage media of claim 17, wherein the executable instructions further include instructions that further cause the computer system to return the particular chunk to a requestor, preserving the hierarchical structure and context of the document.

19. The one or more non-transitory computer-readable storage media of claim 14, wherein the executable instructions that cause the computer system to store the representation as the vector further include instructions that further cause the computer system to receive, from a requestor, a request to query the document, the query comprising a requirement of the requestor.

20. The one or more non-transitory computer-readable storage media of claim 14, wherein the executable instructions that cause the computer system to separate the data from the document into the plurality of chunks include instructions that cause the computer system to utilize a natural language processing algorithm that maintains context of each of the plurality of chunks.

21. The one or more non-transitory computer-readable storage media of claim 14, wherein the executable instructions that cause the computer system to calculate the first statistical measure include instructions that cause the computer system to apply a weight to the first statistical measure that indicates a priority of the first formatting attribute relative to the second formatting attribute in the hierarchical relationship.

* * * * *